United States Patent
Camp

[11] 3,921,870
[45] Nov. 25, 1975

[54] COMBINATION CARRIER AND LATCH
[76] Inventor: Richard H. Camp, Box 1177, Haines, Oreg. 97833
[22] Filed: May 11, 1973
[21] Appl. No.: 359,378

[52] U.S. Cl............ 224/42.07; 24/239; 24/263 SB; 224/29 R; 224/42.03 A; 224/42.43; 224/42.45 R
[51] Int. Cl........................................ B60m 11/00
[58] Field of Search.... 224/29 R, 42.03 A, 42.03 R, 224/32 R, 35, 36, 39 R, 41, 42.07, 42.43, 42.44, 42.08, 42.45 R; 248/215, 226 B; 24/263 SB, 239; 220/18; 180/5 R; D9/247; D12/156, 157, 158

[56] References Cited
FOREIGN PATENTS OR APPLICATIONS
158,452  4/1957  Sweden .................... 24/263 SB OTHER PUBLICATIONS
Pak Rak Publication; 1971; Haines, Oregon.

Primary Examiner—Robert J. Spar
Assistant Examiner—Jerold M. Forsberg
Attorney, Agent, or Firm—John W. Kraft; Charles L. Kraft, II

[57] ABSTRACT

A lock latch for a demountable vehicle carrier having a frame including a pair of horizontal rectilinearly disposed side bars, a pair of upper side bars disposed distally above the lower side bars, a plurality of corner bars which are fastened to the respective terminal ends of the upper and lower side bars and a horizontally, transversely disposed bar fastened between the forwardmost terminal ends of the upper side bars and having a lattice-like carrier floor fastened to the lower side bars, comprises a pair of bar lugs each fastened distally from the terminal ends of the horizontal transverse bar, and a pair of frame lugs fastened to the interior vertex of said corner bar and the lower side bar on the side of the carrier adjacent said horizontal transverse bar.

Each of the bar lugs includes a substantially C-shaped mounting bracket which is fastened upstandingly to the uppermost terminal side to the horizontal transverse bar and with its opening disposed away from the adjacent terminal side of the carrier, and a substantially inverted J-shaped lock lug carrier by a hollow cylindrical collar fastened upstandingly to the horizontal transverse bar adjacent the C-shaped bracket, the lock lug being urged downwardly by a coil spring disposed about the leg of the lock lug.

Each of said frame lugs including a hollow cylindrical collar fastened substantially horizontally to said vertex of the corner bar and the lower side bar, a substantially J-shaped lock lug carried in the collar with its opening disposed toward the rectilinear center and with its crook disposed away from the transverse center of the carrier, the lock lug being urged centrally in the collar by a coil spring disposed about the leg of the lock lug.

1 Claim, 5 Drawing Figures

COMBINATION CARRIER AND LATCH

FIELD OF INVENTION

The present invention relates to vehicle carriers and more particularly to a carrier for motorized sleds and the like.

DESCRIPTION OF THE PRIOR ART

Carrier accessories mounted to vehicles such as motorized snow sleds have included a variety of bracket mounting means through which fasteners may be engaged into the frame or body of the vehicles. It has been found that these fasteners may become dislodged from the vehicle as a result of the typical mechanical vibration. It has also been found that if the carrier is removed from the vehicle, unsightly holes may depreciate the appearance of the body work and frame. Tools are generally required to attach or remove fasteners securing a carrier; this effectively limits the demountable characteristics for which an accessory carrier is sought.

Accordingly, it is an object of the present invention to provide a demountable lock latch means which may be attached or removed from a vehicle without the use of fasteners or tools.

It is a further object of this invention that the lock latch detachably securing a carrier to a vehicle, be durable to resist high impact forces resulting from normal operation of a vehicle such as a snow sled.

These and other objects shall become apparent from the description following, it being understood that modifications may be made without affecting the teachings of the invention here set out.

SUMMARY OF THE INVENTION

A lock latch for a demountable vehicle carrier having a frame including a pair of horizontal rectilinearly disposed sidebars, a pair of upper side bars disposed distally above the lower sidebars, a plurality of corner bars which are fastened to the respective terminal ends of the upper and lower sidebars and a horizontally, transversely disposed bar fastened between the forwardmost terminal ends of the upper sidebars and having a lattice-like carrier floor fastened to the lower sidebars, comprises a pair of bar lugs each fastened distally from the terminal ends of the horizontal transverse bar, and a pair of frame lugs fastened to the interior vertex of said corner bar and the lower side bar on the side of the carrier adjacent said horizontal transverse bar.

Each of the bar lugs includes a substantially C-shaped mounting bracket which is fastened upstandingly to the uppermost terminal side to the horizontal transverse bar and with its opening disposed away from the adjacent terminal side of the carrier, and a substantially inverted J-shaped lock lug carrier by a hollow cylindrical collar fastened upstandingly to the horizontal transverse bar adjacent the C-shaped bracket, the lock lug being urged downwardly by a coil spring disposed about the leg of the lock lug.

Each of said frame lugs including a hollow cylindrical collar fastened substantially horizontally to said vertex of the corner bar and the lower sidebar, a substantially J-shaped lock lug carried in the collar with its opening disposed away from the transverse center of the carrier, the lock lug being urged centrally in the collar by a coil spring disposed about the leg of the lock lug.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
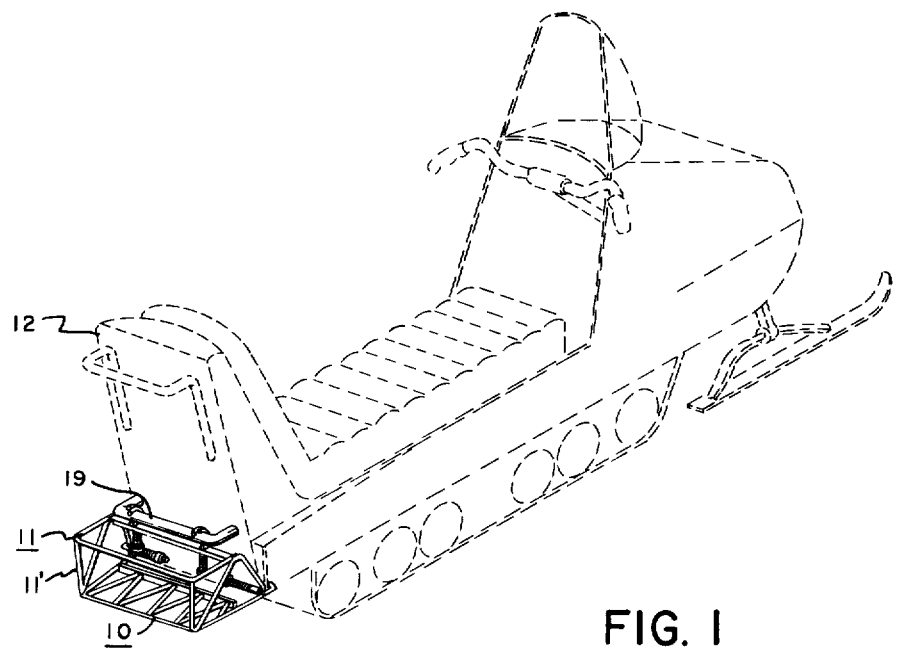
FIG. 1 is a right rear perspective view of the carrier lock latch of this invention shown connecting a carrier to a lifting bar of a motorized snow sled which is shown in broken lines for illustrative purposes.
Figure 2:
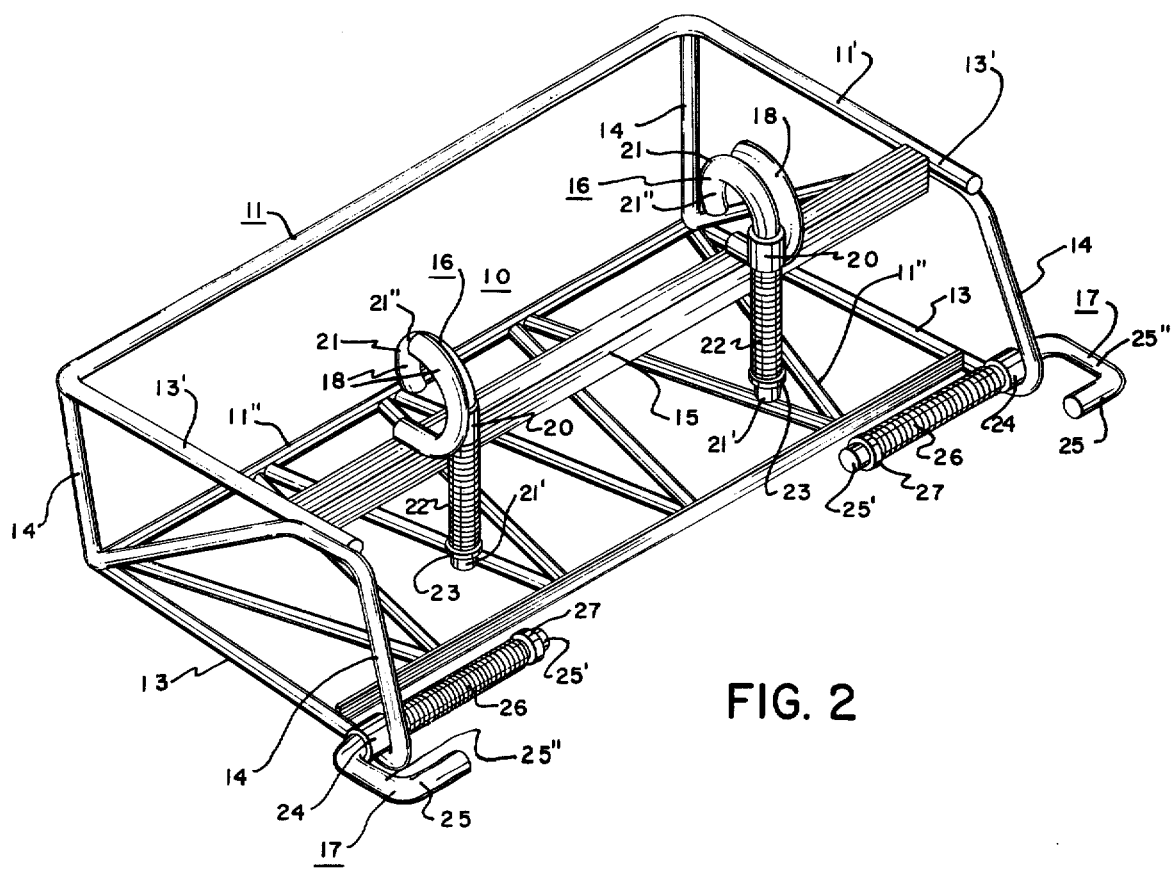
FIG. 2 is a right front perspective view of the carrier and lock latch shown on a carrier.
Figure 3:
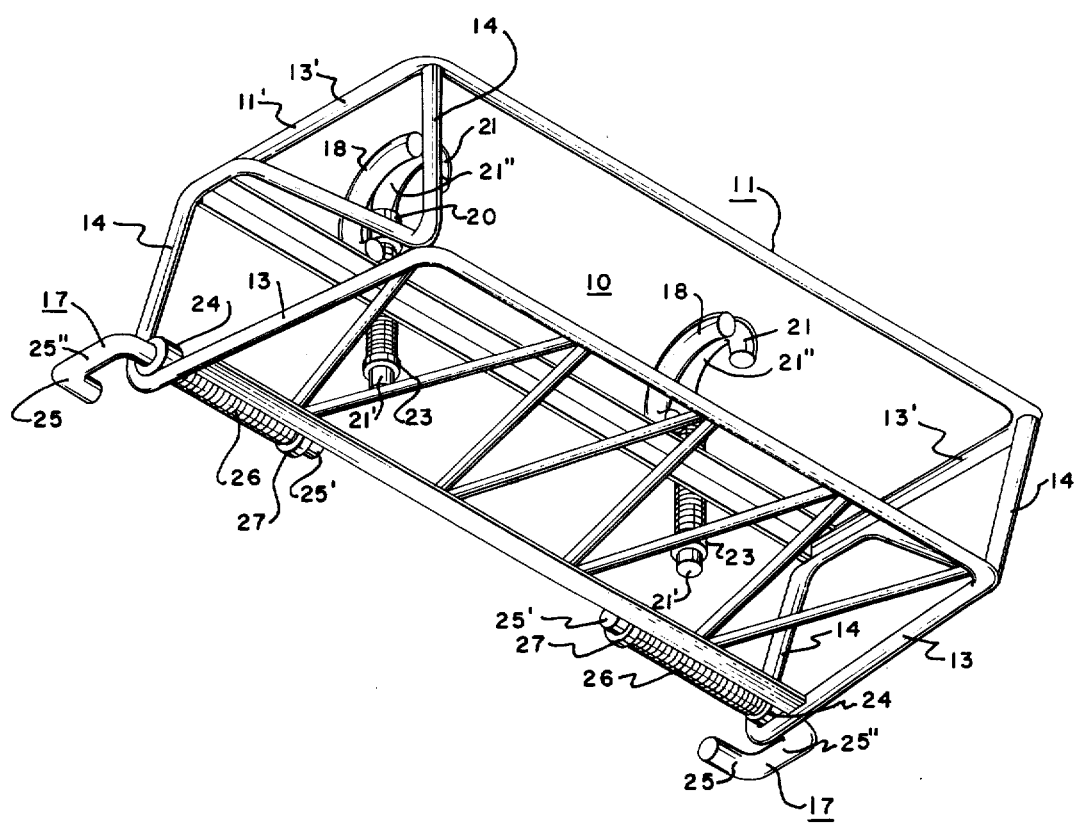
FIG. 3 is a left rear perspective view of the apparatus of the FIG. 2 shown from its underside.

Referring now to the drawings and more particularly to the FIGS. 1, 2 and 3, the lock latch of this invention is shown to advantage and generally identified by the numeral 10. The lock latch 10 is employed as a detachable fastening means for a carrier 11 of the sort disclosed in applicant's U.S. Pat. No. 221,218. The carrier 11 is mounted at the rearwardmost terminal end of a motorized sled 12.

The carrier 11 has a substantially rectangular configuration which is open at its uppermost side and closed at its lowermost side and which may be fabricated of rod-like metal material to form a carrier frame 11' and a lattice-like floor 11''. The frame 11' includes a pair of horizontal lower side bars 13 which may be disposed substantially rectilinearly with respect to the sled 12, a pair of upper side bars 13' which may be disposed distally above the bars 13, a plurality of corner bars 14 which are suitably fastened to the respective pairs of terminal ends of the bars 13 and 13' and a horizontally, transversely disposed bar 15 fastened distally between the forwardmost terminal ends of the upper bars 13'. The floor 11'' may be fastened between the bars 13. It is to be understood that while separate members are discussed, the carrier frame 11' and the carrier floor 11'' may be fabricated of a continuous length of suitably formed rod. It is also to be understood that additional stiffeners and reinforcing means may be included in the carrier 11'.

The lock latch 10 comprises a pair of bar lugs 16 and a pair of frame lugs 17. The bar lugs 16 are fastened distally from the terminal ends of the bar 15. Each of the bar lugs 16 includes a substantially C-shaped mounting bracket 18 which is fastened upstandingly by its base to the uppermost terminal side of the bar 15 with the opening of the bracket 18 disposed rearwardly with respect to the carrier 11. As shown in the FIG. 1, the interior curvature of the mounting bracket 18 is substantially equal to the outside curvature of a lower lifting bar 19 typically provided at the rearwardmost terminal end of the sled 12. Referring again to the FIGS. 1 and 2, a hollow cylindrical collar 20 is fastened upstandingly to one of the terminal sides, substantially at the midpoint of the arc of each of the C-shaped brackets 18. Each bar lug 16 also includes a lock lug 21. The lock lug 21 is a substantially inverted J-shaped member which is fabricated of a suitable rod material, and which is slidably carried by its leg portion 21' within the collar 20. The crook portion 21" of each lock lug 21 follows the curvature of the bracket 18 and extends in a three-quarter circle in which the opening is disposed toward the lowermost side of the rack 11. Each lock lug 21 is urged downwardly, adjacent its bracket 18 by a suitable urging means such as a coil spring 22. The coil spring 22 is mounted between the collar 20 and a sleeve 23 which is fastened distally from the J-shaped end of the leg portion 21'. It is to be understood that while a pair of bar lugs 16 are described, a lock latch 10 may comprise a single lock lug 16 disposed centrally on the rack bar 15.

Each of the pair of frame lugs 17 comprise a collar 24, a lock lug 25, and an urging means such as a coil spring 26. The collar 24 is a hollow cylindrical member fastened sidewardly to the inside vertex of the rack members 13 and 14. The lock lug 25 is a substantially J-shaped member whose leg portion 25' is slidably carried in the collar 24. The crook portion 25" of the lock lug 25 is fabricated with substantially square corners and with its opening disposed centrally with respect to the rack 11. The lock lug 25 is urged centrally by the coil spring 26 which is mounted along the leg portion 25' between the collar 24 and a sleeve 27 which is fastened distally from the J-shaped end opposite the hook portion 25'.

Referring to the FIG. 1, the rack 11 may be installed onto the sled 12 by disposing the bar locks 16 over the lifting bar 19 of the sled 12; then rotating the lower forwardmost terminal end of the rack 11 forwardly and adjacent the rearwardmost terminal end of the sled 12, and engaging the lugs 17 over the lower rearward projecting portion of the sled 12 by pulling the locking lugs 25 outwardly over the projecting portion of the sled 12 and releasing the lugs 25 to compressively engage the sled 12. It may be seen that the lock latch 10 acts not only as a detachable lock mounting means but also as a means for absorbing shocks due to travel of the sled 12 on the bar 19 and the rack engaging portions of the sled 12 when the rack 11 is loaded.

Figure 4:
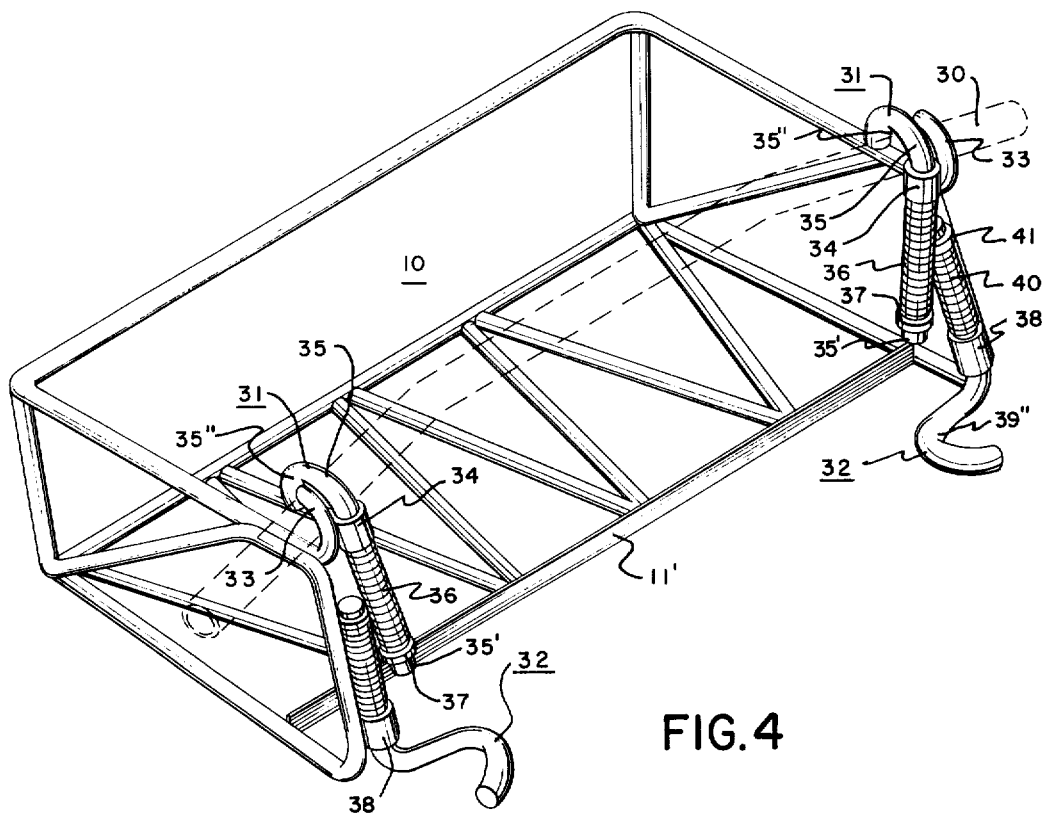
FIG. 4 is a right front perspective view of a further embodiment of the lock latch of this invention shown fastened to a further embodiment of the carrier, and showing a portion of the lower rear lifting bar of a snow sled in broken lines for illustrative purposes.
Figure 5:
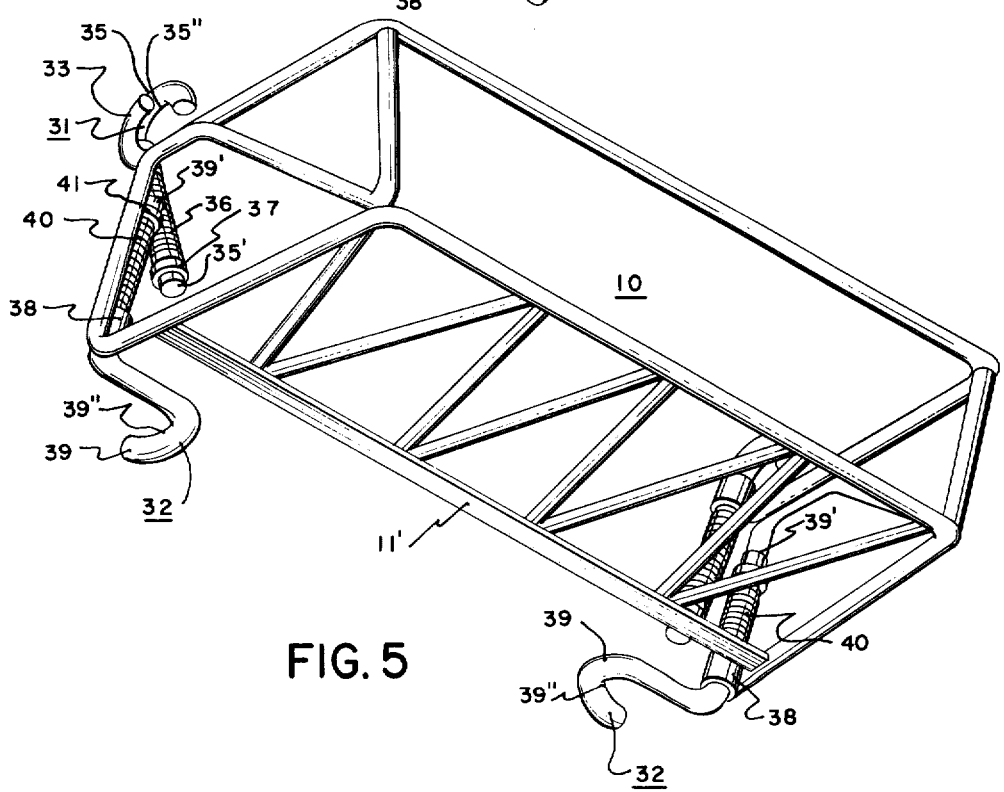
FIG. 5 is a left rear perspective view of the apparatus of the FIG. 4 showing the lock latch and carrier.

Referring now to the FIGS. 4 and 5, a further embodiment of the lock latch 10 is intended to be carried on sleds (not shown) having racks 11' fabricated for sleds having a lift bar 30 which is coextensive with the sled.

The lock latch of the further embodiment (like the lock latch 10 described above comprises a pair of bar lugs 31 and a pair of frame lugs 32. The pair of bar lugs 31 comprises a substantially C-shaped mounting bracket 33, a collar 34, and a lock lug 35. The C-shaped mounting bracket is disposed from the forwardmost terminal end of the upper frame bar of the rack 11' with the opening of the bracket 33 disposed rearwardly with respect to the carrier 11. The interior curvature of the bracket 33 is substantially equal to the outer curvature of the lifting bar 30. The collar 34 is a substantially hollow cylindrical member fastened to the interior terminal side of the mounting bracket 33 to a terminal side, at the midpoint of the arc of the bracket 33. The typical curvature of the lifting bar 30 requires the collar 34 be fastened to the bracket 33 upstandingly at an oblique angle which projects the bar lug 31 slightly forward of the lowermost terminal end of the collar 34. In similar fashion to the lock lug 21, the lock lug 35 is a substantially J-shaped member having its leg portion 35' slidably carried by the collar 34 and its crook portion 35" disposed adjacent to and following in a semi-circle the curvature of the bracket 33. The lock lug 35 is urged downwardly in the collar 35' by an urging coil spring 36 mounted on the leg portion 34' between the collar 34 and a sleeve 37 which is fastened distally from the end opposite the crook portion 35" of the leg portion 35'.

The frame lugs 32 comprise a collar 38, a lock lug 39 and a coil spring 40. The collar 38 is fastened on the interior terminal side of the forwardmost frame member 11' and is fabricated as a hollow cylindrical member. The lock lug 39 comprises a leg portion 39' and a crook portion 39". The leg portion 39' is a shaft which is slidably carried by the collar 38. The crook portion 39" is a substantially C-shaped member with its opening disposed outwardly, to each side of the rack 11'. The crook portion 39" is fastened substantially perpendicularly to the lowermost terminal end of the leg portion 39'. The lock lug 39 is urged upwardly by the coil spring 40, slidably mounted on the leg portion 39' between the uppermost terminal side of the collar 38 and a sleeve 41 which is fastened distally from the end opposite the crook portion 39" on the leg portion 39'.

Referring to the FIG. 4, the rack 11' may be mounted to a motorized snow sled 12 by engaging the bar lugs 31 over the lifting bar 30, in the manner of the bar lugs 16 over the lifting bar 19, rotating the rack 11' forwardly and adjacent the lowermost terminal end of the rack 11 adjacent the rearwardmost terminal end of the sled 12 and engaging the frame lugs 32 under the frame member of the sled 12. It is to be understood that in either embodiment of the lock latch 10 for racks 11 or 11', the respective rack may be removed by the reverse steps set out with respective lock latches 10.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim

1. In the combination of a lock latch for demountably securing a carrier to a vehicle, said vehicle carrier having a frame including a pair of horizontal rectilinearly disposed side bars, a pair of upper side bars disposed distally above said lower side bars, a plurality of corner bars which are fastened to the respective terminal ends of said upper and lower side bars, a horizontally, transversely disposed bar fastened between the forwardmost terminal ends of said upper side bars and having a lattice-like carrier floor fastened to said lower side bars, the improvement comprising:

a pair of bar lugs each engaging a lifting bar provided at the rearward end of said vehicle, each bar lug being fastened distally from the terminal ends of said horizontal transverse bar, said bar lugs including a substantially C-shaped mounting bracket engageable with said lifting bar which is fastened upstandingly to the uppermost terminal side to said horizontal transverse bar and with its opening disposed away from the adjacent terminal side of said carrier, and a substantially inverted J-shaped lock lug carrier by a hollow cylindrical collar fastened upstandingly to said horizontal transverse bar adjacent said C-shaped bracket, said lock lug being urged downwardly by a coil spring disposed about the leg of said lock lug to engage said lub with said lifting bar; and a pair of frame lugs engaging a frame portion of said vehicle, each of said lugs being fastened to the interior vertex of said corner bar and said lower side bar on the side of said carrier adjacent said horizontal transverse bar, each of said frame lugs including a hollow cylindrical collar fastened substantially horizontally to said vertex of said corner bar and said lower side bar, a substantially J-shaped lock lug carried by its leg in said collar with its opening disposed toward the rectilinear center and with its crook disposed away from the transverse center of said carrier to engage said lock lug to said frame, said lock lug being urged centrally in said collar by a coil spring disposed about the leg of said lock lug to engage said lock lug with said frame.

* * * * *